United States Patent
Droux et al.

(10) Patent No.: US 7,675,920 B1
(45) Date of Patent: Mar. 9, 2010

(54) METHOD AND APPARATUS FOR PROCESSING NETWORK TRAFFIC ASSOCIATED WITH SPECIFIC PROTOCOLS

(75) Inventors: Nicolas G. Droux, San Jose, CA (US); Sunay Tripathi, San Jose, CA (US); Eric T. Cheng, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1284 days.

(21) Appl. No.: 11/112,228

(22) Filed: Apr. 22, 2005

(51) Int. Cl.
H04L 12/28 (2006.01)

(52) U.S. Cl. .............................. 370/395.5; 370/395.41; 370/395.42; 370/395.21

(58) Field of Classification Search ................ 370/230, 370/392, 396, 395.21, 395.41, 395.42, 395.5
See application file for complete search history.

(56) References Cited

U.S. PATENT DOCUMENTS

| | | | |
|---|---|---|---|
| 5,918,018 A * | 6/1999 | Gooderum et al. ........... 709/225 |
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A * | 12/2000 | Alexander et al. ........... 370/392 |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,829,217 B1 | 12/2004 | Bechtolsheim et al. | |
| 6,831,893 B1 * | 12/2004 | Ben Nun et al. ............ 370/235 |
| 6,859,841 B2 | 2/2005 | Narad et al. | |
| 6,944,168 B2 * | 9/2005 | Paatela et al. ............... 370/401 |
| 7,046,665 B1 | 5/2006 | Walrand et al. | |
| 7,146,431 B2 | 12/2006 | Hipp et al. | |
| 7,177,311 B1 * | 2/2007 | Hussain et al. .............. 370/392 |
| 7,257,815 B2 | 8/2007 | Gbadegesin et al. | |
| 7,260,102 B2 | 8/2007 | Mehrvar et al. | |
| 7,281,075 B2 * | 10/2007 | Armstrong et al. .......... 710/267 |
| 7,313,142 B2 * | 12/2007 | Matsuo et al. ......... 370/395.32 |
| 7,467,381 B2 * | 12/2008 | Madukkarumukumana et al. .............................. 718/1 |
| 7,502,884 B1 * | 3/2009 | Shah et al. .................. 710/316 |

(Continued)

OTHER PUBLICATIONS

Dovrolis et al; "HP:Hyrid Interrupt-Polling for the Network Interface"; Oct. 2001; pp. 50-60.*

(Continued)

Primary Examiner—Ricky Ngo
Assistant Examiner—Dewanda Samuel
(74) Attorney, Agent, or Firm—Osha • Liang LLP

(57) ABSTRACT

A system that includes a network interface for receiving a packets from a network, a classifier operatively connected to the network interface that analyzes each of the packets and determines to which temporary data structure to forward each of packets, wherein the classifier analyzes each packet to determine with which of a plurality of protocols the packet is associated with. Each temporary data structure within the system is configured to receive packets from the classifier, wherein each of the temporary data structures is associated with at least one virtual serialization queue and wherein each of the temporary data structures is configured to store packets associated with at least one of the plurality of protocols. The at least one virtual serialization queue is configured to queue packets from the one of the temporary data structures associated with the at least one virtual serialization queue.

18 Claims, 7 Drawing Sheets

U.S. PATENT DOCUMENTS

| | | | |
|---|---|---|---|
| 7,561,531 B2 * | 7/2009 | Lewites et al. | 370/254 |
| 2002/0052972 A1 | 5/2002 | Yim | |
| 2003/0037154 A1 * | 2/2003 | Poggio et al. | 709/230 |
| 2005/0080982 A1 * | 4/2005 | Vasilevsky et al. | 711/1 |
| 2005/0135243 A1 | 6/2005 | Lee et al. | |
| 2005/0177657 A1 * | 8/2005 | Pope et al. | 710/36 |
| 2005/0182853 A1 * | 8/2005 | Lewites et al. | 709/238 |
| 2006/0041667 A1 | 2/2006 | Ahn et al. | |
| 2006/0070066 A1 | 3/2006 | Grobman | |
| 2006/0174324 A1 | 8/2006 | Zur et al. | |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, 10 Pages.

* cited by examiner

METHOD AND APPARATUS FOR PROCESSING NETWORK TRAFFIC ASSOCIATED WITH SPECIFIC PROTOCOLS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" Ser. No. 11/112,367; "Method and Apparatus for Consolidating Available Computing Resources on Different Computing Devices" Ser. No. 11/112,368; "Assigning Higher Priority to Transactions Based on Subscription Level" Ser. No. 11/112,947; "Method and Apparatus for Dynamically Isolating Affected Services Under Denial of Service Attack" Ser. No. 11/112,158; "Method and Apparatus for Improving User Experience for Legitimate Traffic of a Service Impacted by Denial of Service Attack" Ser. No. 11/112,629; "Method and Apparatus for Limiting Denial of Service Attack by Limiting Traffic for Hosts" Ser. No. 11/112,328; "Hardware-Based Network Interface Per-Ring Resource Accounting" Ser. No. 11/112,222; "Dynamic Hardware Classification Engine Updating for a Network Interface" Ser. No. 11/112,934; "Network Interface Card Resource Mapping to Virtual Network Interface Cards" Ser. No. 11/112,063; "Network Interface Decryption and Classification Technique" Ser. No. 11/112,436; "Method and Apparatus for Enforcing Resource Utilization of a Container" Ser. No. 11/112,910; "Method and Apparatus for Enforcing Packet Destination Specific Priority Using Threads" Ser. No. 11/112,584; and "Method and Apparatus for Enforcing Bandwidth Utilization of a Virtual Serialization Queue" Ser. No. 11/112,322

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

The packets associated with each of the active connections may be associated with any one of a number of protocols (e.g., Transport Communication Protocol, Internet Security Protocol (IPsec), etc.). Accordingly, the serialization queue with which the connection is associated typically queues packets of a number of different protocols. Because, the serialization queue is associated with a given CPU, the CPU typically has to take specific steps (e.g., load the necessary code to process packets of a particular protocol into the i-cache associated with the CPU, etc.) to process the packets associated with the different protocols.

SUMMARY

In general, in one aspect, the invention relates to a method for processing a plurality of packets, that includes receiving a plurality of packets from a network, analyzing each of the plurality of packets by a classifier to determine to which of a plurality of temporary data structures each of the plurality of packet is to be forwarded, wherein the classifier analyzes each of the plurality of packets to determine with which of a plurality of protocols each of the plurality of packets is associated, forwarding each of the plurality of packets to one of the plurality of temporary data structures as determined by the classifier, wherein each of the plurality of temporary data structures is configured to store packets associated with at least one of the plurality of protocols, forwarding a plurality of packets from the one of the plurality of temporary data structures to a virtual serialization queue associated with the one of the plurality of temporary data structures, and processing the plurality of packets on the virtual serialization queue using a processor bound to the virtual serialization queue.

In general, in one aspect, the invention relates to a system, that includes a network interface configured to receive a plurality of packets from a network, a classifier operatively connected to the network interface configured to analyze each of the plurality of packets and determine to which of a plurality of temporary data structures each of the plurality of packets is forwarded, wherein the classifier analyzes each of the plurality of packets to determine with which of a plurality of protocols each of the plurality of packets is associated, the plurality of temporary data structures configured to receive packets from the classifier, wherein each of the plurality of temporary data structures is associated with at least one virtual serialization queue and wherein each of the plurality of temporary data structures is configured to store packets associated with at least one of the plurality of protocols, and the at least one virtual serialization queue configured to queue a plurality of packets from the one of the plurality of temporary data structures associated with the at least one virtual serialization queue.

Other aspects of the invention will be apparent from the following description and the appended claims.

DETAILED DESCRIPTION

Figure 1A:
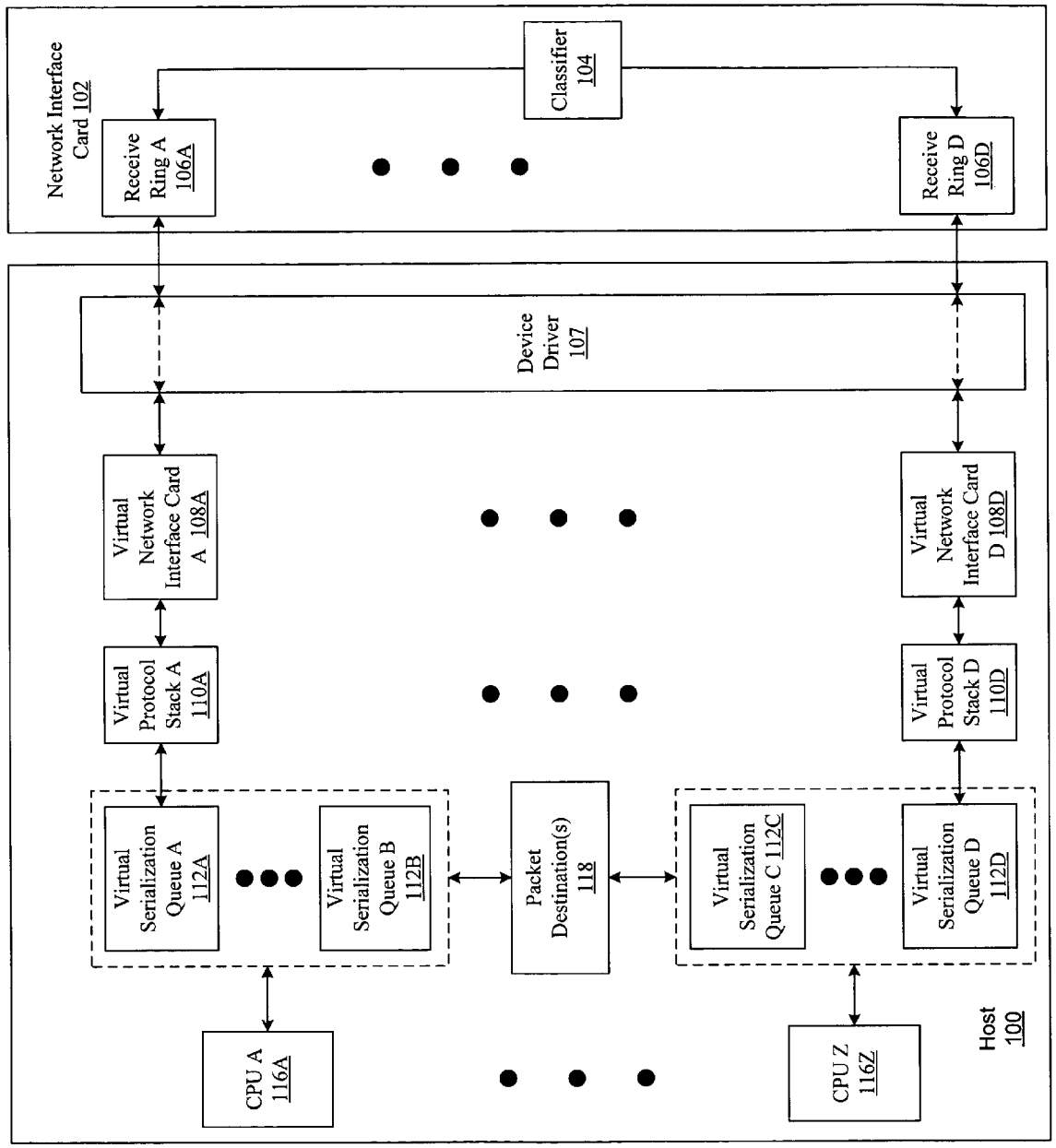
FIGS. 1A and 1B show systems in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for processing packets on a per-protocol (or group of protocols) basis. More specifically, embodiments of the invention provide virtual network stacks and temporary data structures that may be configured to process specific protocols or groups of protocols. Further, embodiments of the invention provide mechanisms to allow processing of certain types of packets to be offloaded to network processing units (NPUs). By providing functionality to separate and process packets on a per-protocol (or group of protocols) basis, the CPUs bound to the virtual network stacks may operate more efficiently because they do not need to continuously load different code into the associated i-caches to process different packets of different protocol types.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing. In one embodiment of the invention, the NIC (102) includes a classifier (104) and one or more receive rings (106A, 106D). In one embodiment of the invention, the receive rings (106A, 106D) correspond to portions of memory within the NIC (102) used to temporarily store the received packets. Further, in one embodiment of the invention, a ring element of the receive rings (106A, 106D) may point to host memory. In one embodiment of the invention, the classifier (104) is configured to analyze the incoming network traffic, typically in the form of packets, received from the network (not shown).

In one embodiment of the invention, analyzing individual packets includes determining to which of the receive rings (106A, 106D) each packet is forwarded. In one embodiment of the invention, analyzing the packets by the classifier (104) includes analyzing one or more fields in each of the packets to determine to which of the receive rings (106A, 106D) the packets are forwarded. As an alternative, the classifier (104) may use the contents of one or more fields in each packet as an index into a data structure that includes information necessary to determine to which receive ring (106A, 106D) that packet is forwarded. The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the NIC (102) may be operatively connected to one or more NPUs (not shown). In one embodiment of the invention, an NPU corresponds to a configurable integrated circuit (IC) configured to process packets of a particular protocol or group of protocols. NPUs are typically used to offload specialized packet processing prior to the packets being stored in the receive rings (106A, 106C, 106D), thereby decreasing the load on the CPUs (116A, 116N) on the host (100).

In one embodiment of the invention, the classifier (104) is configured to determine whether a given packet may be processed (or needs to be processed) by an NPU operatively connected to the NIC (102). If the classifier (104) determines that the packet can be processed (or needs to be processed) by the NPU, then the packet is forwarded to the NPU for processing. Once the NPU has finished processing the packet, the processed packet may be forwarded to the classifier (104) for further analysis (for example, in the case where the original incoming packet was an IPsec packet) or the processed packet may be forwarded directly to the receive ring (106A, 106D) as previously determined by the classifier (104).

In one embodiment of the invention, the host (100) may include the following components: a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more packet destinations (118) (e.g., containers and/or services). In one embodiment of the invention, the device driver (107) provides an interface between the receive rings (106A, 106D) and the host (100). More specifically, the device driver (107) exposes the receive rings (106A, 106D) to the host (100). In one embodiment of the invention, each of the virtual NICs (108A, 108D) is associated with one or more receive rings (106A, 106D). The virtual NICs (108A, 108D) provide an abstraction layer between the NIC (102) and the various packet destinations (118) (e.g., containers and/or services) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more ports, and configured to handle one or more protocols. Thus, while the host (100) may be operatively connected to a single NIC (102), packet destinations (118) (e.g., containers and/or services) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (100) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to containers, services (e.g., web server), etc.

Figure 1B:
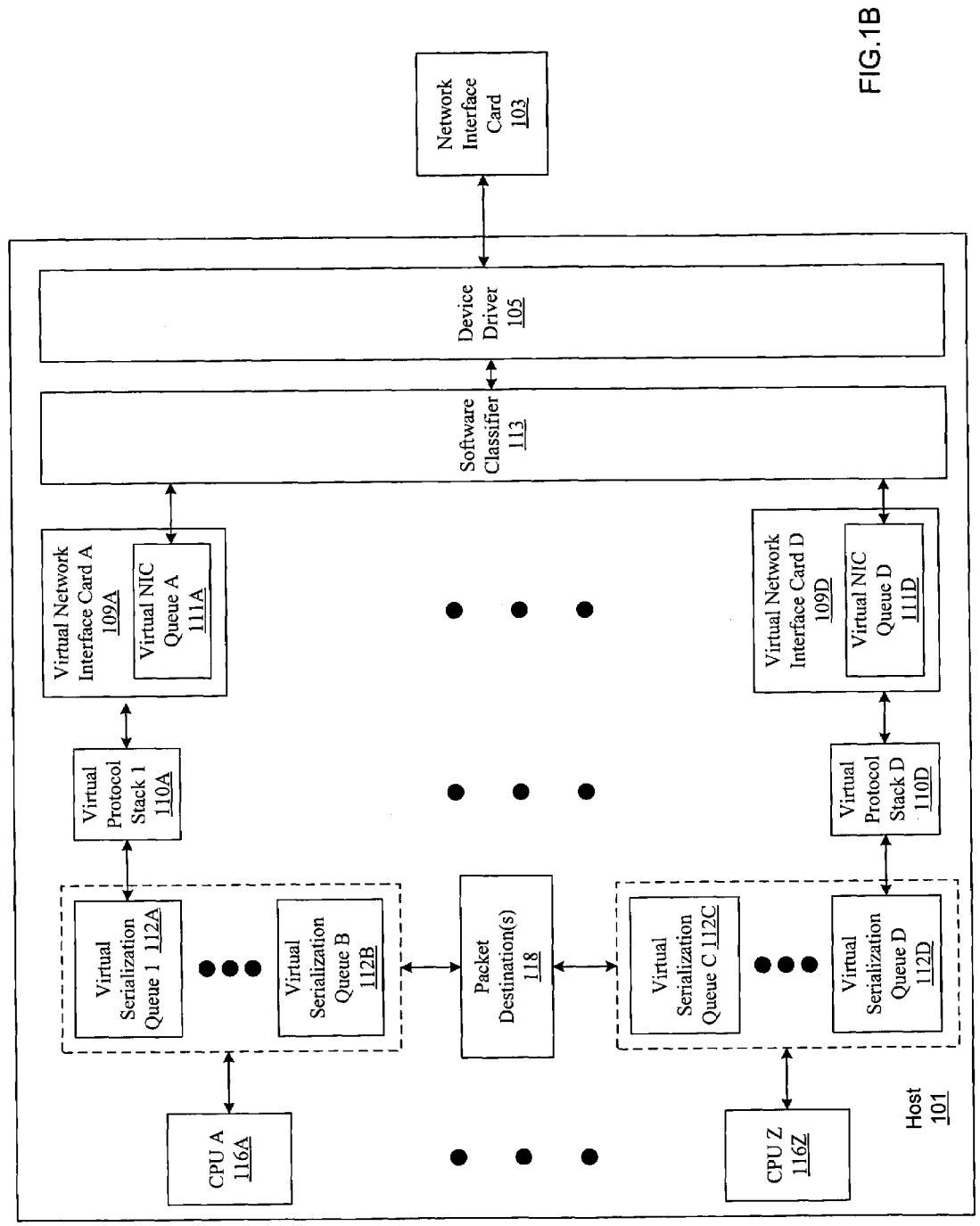

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes a NI (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: a device driver (105), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one packet destination (118) (e.g., containers and/or services). In one embodiment of the invention, the software classifier (113) is configured to analyze the incoming network traffic, typically in the form of packets, received from the network (not shown).

In one embodiment of the invention, the purpose of classifying the packets is to determine to which of the virtual NIC queues (111A, 111D) each of the packets is forwarded. In one embodiment of the invention, the virtual NIC queues (111A, 111D) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D) each of the packets is forwarded. As an alternative, the software classifier (113) may use the contents of one or more fields in each packet as an index into a data structure that includes information necessary to determine which virtual NIC queue (111A, 111D) each of the packets is forwarded.

As shown in FIG. 1B, the device driver (105) is operatively connected to the software classifier (113) and provides an interface between the NIC (103) and the host (101). In one embodiment of the invention, each of the virtual NICs (109A, 109D) includes one or more virtual NIC queues (111A, 111D). The virtual NICs (109A, 109D) provide an abstraction layer between the NIC (103) and the various packet destinations (118) (e.g., containers and/or services) executing on the host (101). More specifically, each virtual NIC (109A, 109D) operates like a NIC (101). For example, in one embodiment of the invention, each virtual NIC (109A, 109D) is associated with one or more Internet Protocol (IP) addresses, one or more ports, and configured to handle one or more protocols. Thus, while the host (101) may be operatively connected to a single NIC (103), the host (101) (or more specifically, packet destinations (118) (e.g., containers and/or services) (at both the kernel level and the user-level) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated packet destinations (118) (e.g., containers and/or services). The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, the host (101) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to, containers, services (e.g., web server), etc. In one embodiment of the invention, each packet destination (118) (e.g., containers and/or services) may be associated with one or more virtual serialization queues (112A, 112B, 112C, 112D).

Figure 2:
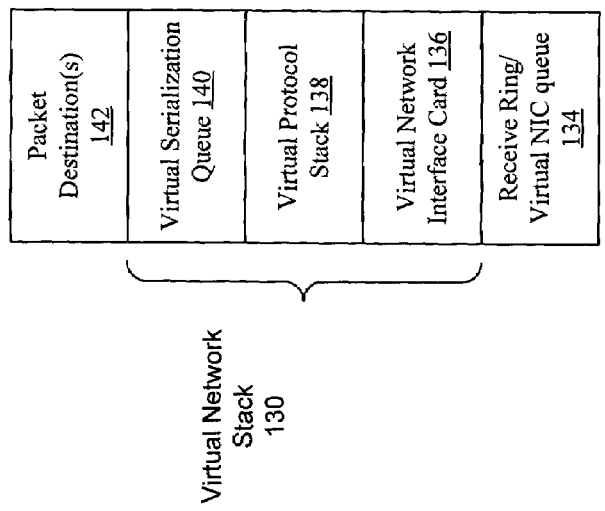
FIG. 2 shows a virtual network stack in accordance with one embodiment of the invention.

In one embodiment of the invention, the receive rings and the virtual NIC queues may be generally referred to as temporary data structures. Further, in one embodiment of the invention, a system, as shown in FIGS. 1 and 2, may include multiple hosts (such as host (100) in FIG. 1 and host (101) in FIG. 2) where each host is operatively connected to one or more NICs. In one embodiment of the invention, each of the NICs may correspond to the NIC shown in FIG. 1 (i.e., NIC (102)) or the NIC shown in FIG. 1B (i.e., NIC (103)). Thus, in a given system, one host may include a software classifier while another host may be connected to a NIC with a hardware classifier. In this scenario, the host would be configured to support both implementations, as described above with in FIGS. 1A and 1B.

In one embodiment of the invention, the receive rings (discussed in FIG. 1A) and the virtual NIC queues (discussed in FIG. 1B) are configured to temporarily store packets based on protocol (e.g., TCP, IP, IPsec, UDP, etc.). For example, there may be a receive ring or a virtual NIC queue for each protocol supported by the host. Alternatively, there may be a receive ring or a virtual NIC queue for a group of protocols. For example, there may be a receive ring or a virtual NIC queue configured to store TCP and IP packets and another receive ring or a virtual NIC queue configured to store only UDP packets.

In one embodiment of the invention, there may be a separate receive ring or virtual NIC queue for each protocol (or groups of protocols) supported by the packet destination (i.e., protocols that the packet destination is configured to receive). In this scenario, the classifier analyzes each incoming packet to determine: (i) the packet destination; and (ii) the protocol of the packet. Using the aforementioned information, the classifier forwards the packet to the appropriate receive ring or virtual NIC queue.

As discussed above, each of the aforementioned receive rings or virtual NIC queues are bound to a virtual network stack. (See FIG. 2 below). Further, each of the virtual network stacks are bound single CPU on the host. In one embodiment of the invention, the CPUs are bound to the virtual network stacks such that a given CPU in the host only processes packets associated with a single protocol or group of protocols. For example, all receive rings or virtual network stacks configured to store TCP packets may be bound to the same CPU or set of CPUs on the host (e.g., a processor set).

Those skilled in the art will appreciate that while FIG. 1A and FIG. 1B refer to CPUs, any type of processor (i.e., a device which may be configured to process packets) may be used.

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack 138), and a virtual serialization queue (140). In one embodiment of the invention, the virtual network stack (130) may be bound to one or more receive rings or virtual NIC interfaces (134) (depending on the implementation). Further, the virtual network stack (130) may be bound to one or more packet destinations (142) (e.g., containers and/or services). All of the aforementioned components in the virtual network stack (130) are bound together such that a packet received by the virtual NIC (136) of a particular virtual network stack (130) is forwarded through the other components of the virtual network stack (130) until the packet reaches the packet destination (142) (e.g., containers and/or services) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
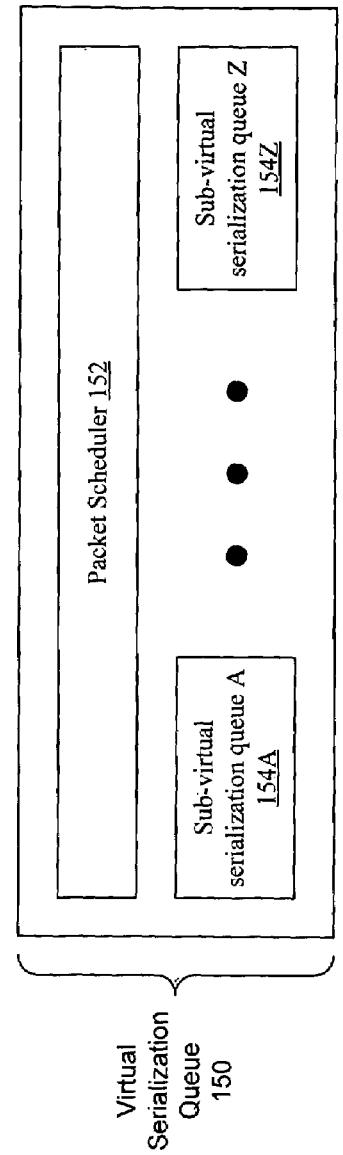
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) is also associated with a corresponding number of receive rings and/or virtual NIC queues (depending on the implementation). Thus, each of the sub-virtual serialization queues (154A, 154Z) is bound to one of the aforementioned receive rings and/or virtual NIC queues (depending on the implementation). Thus, when the virtual serialization queue (150) receives packets from one or more associated receive rings or a virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, each of the sub-virtual serialization queues (154A, 154Z) includes a pair of FIFO queues, namely an inbound queue and an outbound queue.

In view of the above discussion of FIG. 3, a virtual serialization queue associated with a particular packet destination may be configured as follows in accordance with one embodiment of the invention. Specifically, consider a scenario in which the packet destination is configured to receive TCP, IP, and IPsec packets. In this scenario, the virtual serialization queue may be configured to include two sub-virtual serialization queues, namely, a first sub-virtual serialization queue configured to store TCP and IP packets, and a second sub-virtual serialization queue configured to store IPsec packets. In this scenario, the virtual network stack, with which the virtual serialization queue is associated, may be bound to two temporary data structures: a first temporary data structure configured to store TCP and IP packets and a second temporary data structure configured to store IPsec packets. In addition, the classifier is configured to forward TCP and IP packets for the packet destination to the first temporary data structure and forward IPsec packets to the second temporary data structure.

Thus, when a packet is received, the classifier analyzes the packet and subsequently forwards the packet to the corresponding temporary data structure. At some point (depending on whether the virtual serialization queue is operating in interrupt mode or polling mode), the packets are forwarded from the temporary data structure through the associated virtual network stack to the virtual serialization queue. Once the packets arrive at the virtual serialization queue, each packet is placed in the appropriate sub-virtual serialization queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (150) may include functionality to support both fair-share scheduling and time-sharing scheduling with respect to processing of the packets queued on the sub-virtual serialization queues (154A, 154Z). Further, the packet scheduler (150) may also be configured to schedule packet processing based on the priority associated with each of the sub-virtual serialization queues (154A, 154Z).

Figure 4:
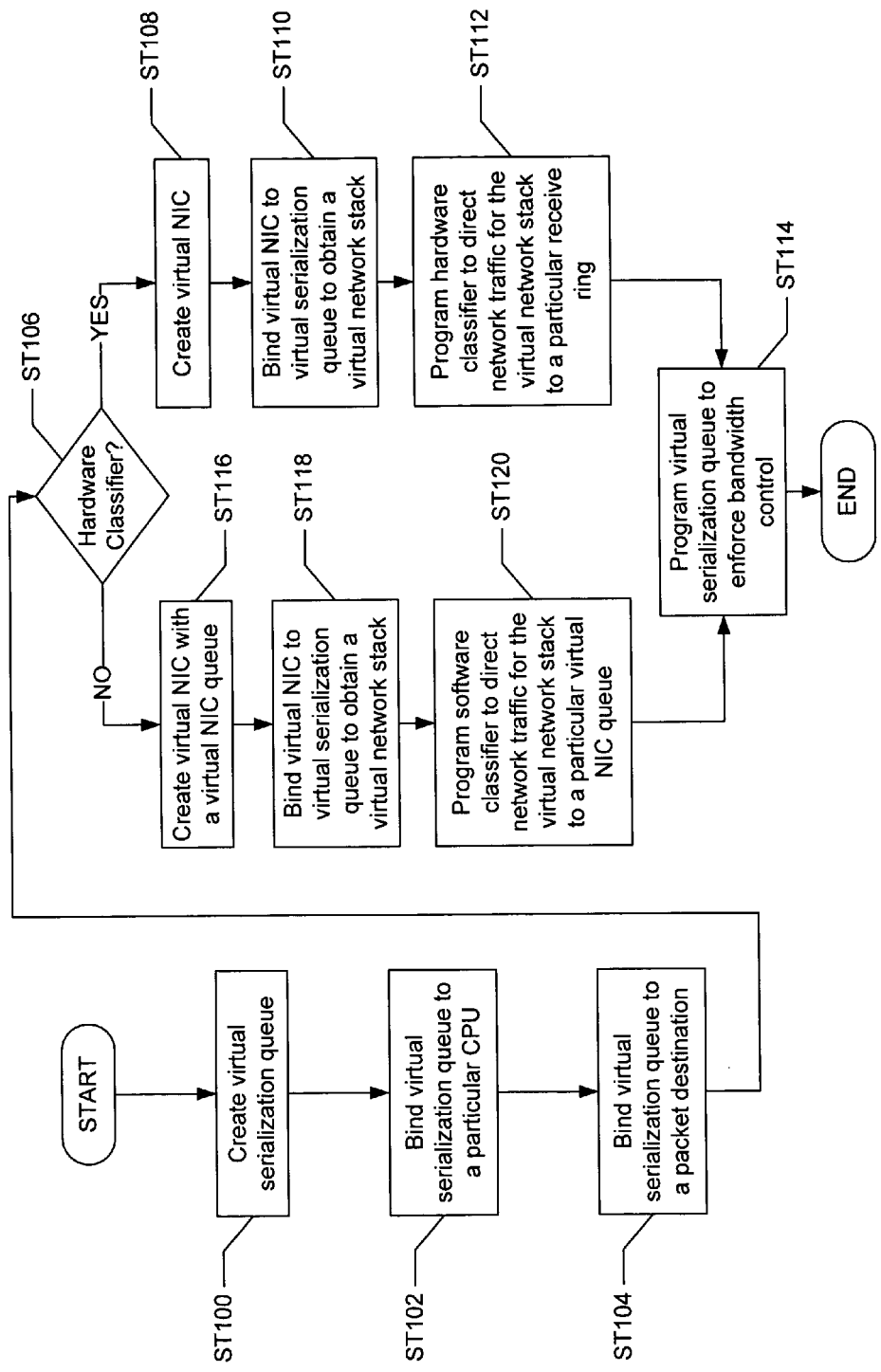
FIG. 4 shows a flowchart in accordance with one embodiment of the invention.

FIG. 4 shows a flowchart in accordance with one embodiment of the invention. Initially, a virtual serialization queue as shown and described in FIG. 1A, FIG. 1B, FIG. 2, and FIG. 3 is created (ST100). In one embodiment of the invention, creating the virtual serialization queue may include specifying one or more sub-virtual serialization queues and configuring the packet scheduler. The virtual serialization queue is subsequently bound to a CPU on the host (ST102). Those skilled in the art will appreciate that the virtual serialization queue created in ST100 may be implicitly bound to a CPU upon creation. In one embodiment of the invention, the CPU to which each virtual serialization queue is bound depends on which protocol (or group of protocols) the CPU is designated to process. For example, if the virtual serialization queue is to be bound to a temporary data structure that is configured to store TCP packets, then virtual serialization queue is bound to a CPU which is designated as the CPU for processing TCP packets.

Continuing with the discussion of FIG. 4, at this stage, the virtual serialization queue is bound to a packet destination (e.g., containers and/or services) (ST104). Those of ordinary skill in the art will appreciate that the packet destination (118) (e.g., containers and/or services) may be bound to the virtual serialization queue any time after the virtual serialization queue has been created.

A determination is now made whether a NIC associated with the host includes a hardware classifier (ST106). If the NIC includes a hardware classifier, then a virtual NIC is created (ST108) and bound to the virtual serialization queue created in ST100 to obtain a virtual network stack (ST110). The hardware classifier is subsequently programmed so that network traffic for the virtual network stack created in ST110 is directed to a particular receive ring by the hardware classifier (ST112). In one embodiment of the invention, the hardware classifier is programmed such that packets for a particular packet destination and of a specific protocol or group of protocols are all forwarded to a particular receive ring in the NIC. Thus, all packets of the same protocol or group of protocols for a particular packet destination are forwarded to a particular receive ring.

For example, if a host includes two packet destinations (packet destination 1 and packet destination 2) where packet destination 1 receives TCP, IP, and IPsec packets and packet destination 2 receives TCP, UDP, and ICMP packets, then the hardware classifier may be programmed as follows: (i) send all TCP and IP packets for packet destination 1 to receive ring 1; (ii) send all IPsec packets for packet destination 1 to receive ring 2; (iii) send all TCP packets for packet destination 2 to receive ring 3; (iv) send all UDP packets for packet destination 2 to receive ring 4; and (v) send all ICMP packets for packet destination 2 to receive ring 5. Further, assuming that the host includes three CPUs, then receive rings 1 and 3 is bound to CPU 1, receive ring 2 is bound to CPU 2, and receive rings 4 and 5 are bound to CPU 3. Those skilled in the art will appreciate that the aforementioned discussion is only an example and is not intended to limit the scope of the invention.

Continuing with the discussion of FIG. 4, the virtual serialization queue created in ST100 is subsequently programmed to enforce bandwidth control (ST114). In one or more embodiments of the invention, ST114 is optional. In one embodiment of the invention, programming the virtual serialization to enforce bandwidth control includes specifying a bandwidth control parameter for the virtual serialization queue. In one embodiment of the invention, the bandwidth control parameter specifies the maximum number of packets that may be processed by the virtual serialization queue over a specific time period (e.g., number of packets that may be processed by the specific virtual serialization queue per second). Alternatively, the bandwidth control parameter may specify the maximum number of bytes of data that may be processed by the virtual serialization queue in a specific time period.

Those skilled in the art will appreciate that the classifier (software or hardware) may be programming using an interface exposed by the classifier, using a management/configuration program executing on the host, etc.

Continuing the discussion of FIG. 4, if the NIC does not include a hardware classifier (i.e., the scenario in which the host includes a NIC having a software classifier), then a virtual NIC with a virtual NIC queue is created (ST116) and bound to the virtual serialization queue created in ST100 to obtain a virtual network stack (ST118). The software classifier is then programmed so that network traffic for the virtual network stack created in ST110 is directed to a particular virtual NIC queue by the software classifier (ST120). In one embodiment of the invention, the software classifier is programmed in the same manner as the hardware classifier as discussed above in ST112. The method then proceeds to ST114.

Those skilled in the art will appreciate that the steps shown in FIG. 4 may be repeated as required to create any number of virtual network stacks. Once the virtual network stack(s) has been created, as described above, the host may proceed to receive packets from the network. Those skilled in the art will appreciate that the number of virtual network stacks created using the steps shown in FIG. 4 may vary based on the available system resources (e.g., number of CPUs, type of NIC, etc.)

Figure 5:
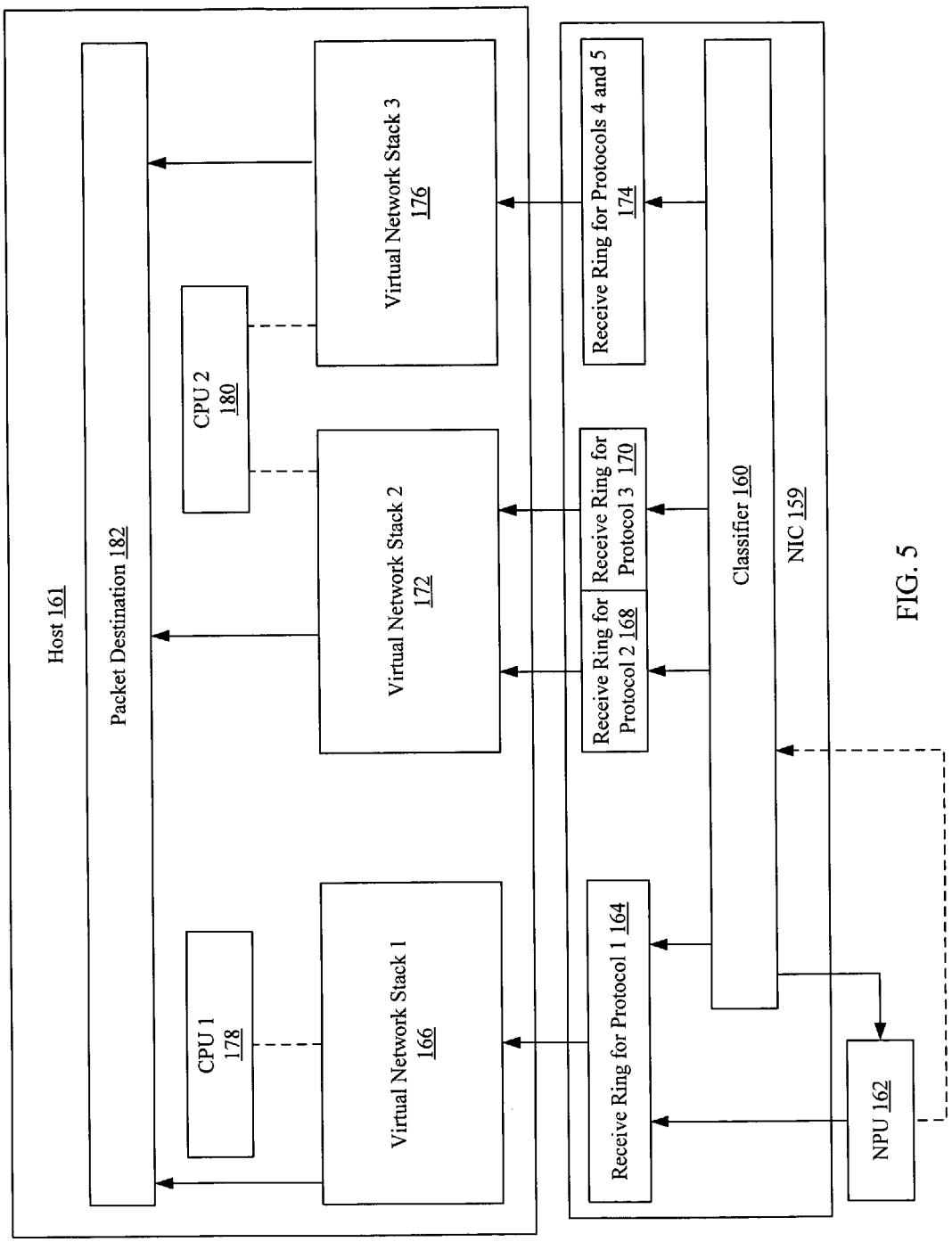
FIG. 5 shows an exemplary system in accordance with one embodiment of the invention.

FIG. 5. shows an exemplary system after the steps in FIG. 4. have been performed in accordance with one embodiment of the invention. The exemplary system is not intended to limit the scope of the invention. The system shown in FIG. 5. includes a host (161) operatively connected to a NIC (159). More specifically, the NIC (159) includes a classifier (160) as well as four receive rings (164, 168, 170, 174). Each of the receive rings is configured to store packets associated with at least one protocol. More specifically, a receive ring exists for protocol 1 (164), a receive ring exists for protocol 2 (168), a receive ring exists for protocol 3 (170), and receive rings exist for protocols 4 and 5 (174). Those skilled in the art will appreciate that the classifier (160) is configured to forward received packets to the appropriate receive ring.

The NIC (159) is also operatively connected to a NPU (162). In the system shown in FIG. 5, the NPU (162) is configured to only process protocol 1 packets. Thus, the classifier (160), upon receiving protocol 1 packets, may either forward the protocol 1 packets directly to the receive ring for protocol 1 (164) or to NPU (164) for processing. If the packets are sent to and processed by the NPU (164), then the NPU (164) may either forward the processed packets to the classifier (160) for further classification or to the receive ring for protocol 1 (164). Those skilled in the art will appreciate that any number of heuristics may be used by the classifier (160) to determine whether to forward the protocol 1 packets to the NPU (162). In addition, those skilled in the art will appreciate that any number of heuristics may be used by the NPU (162) to determine whether to forward the processed packets to the classifier (162) or to the receive ring for protocol 1 (164).

Continuing with the discussion of FIG. 5, the receive ring for protocol 1 (164) is bound to virtual network stack 1 (166), the receive ring from protocol 2 (168) and the receive ring for protocol 3 (170) are bound to virtual network stack 2 (172), and the receive ring for protocols 4 and 5 (174) is bound to virtual network stack 3 (176). Though not shown in FIG. 5, virtual network stack 2 includes two sub-virtual serialization queues where one sub-virtual serialization queue is configured to store protocol 2 packets and one sub-virtual serialization queue is configured to store protocol 3 packets.

As shown in FIG. 5, virtual network stack 1 (166) is bound to CPU 1 (178) while virtual network stacks 2 (172) and 3 (176) are bound to CPU 2 (180). Further, all the virtual network stacks (166, 172, 176) are bound to the packet destination (182). Thus, CPU 1 (166) will process packets for protocol 1, while CPU 2 will process packets for protocols 2, 3, 4, and 5.

Figure 6:
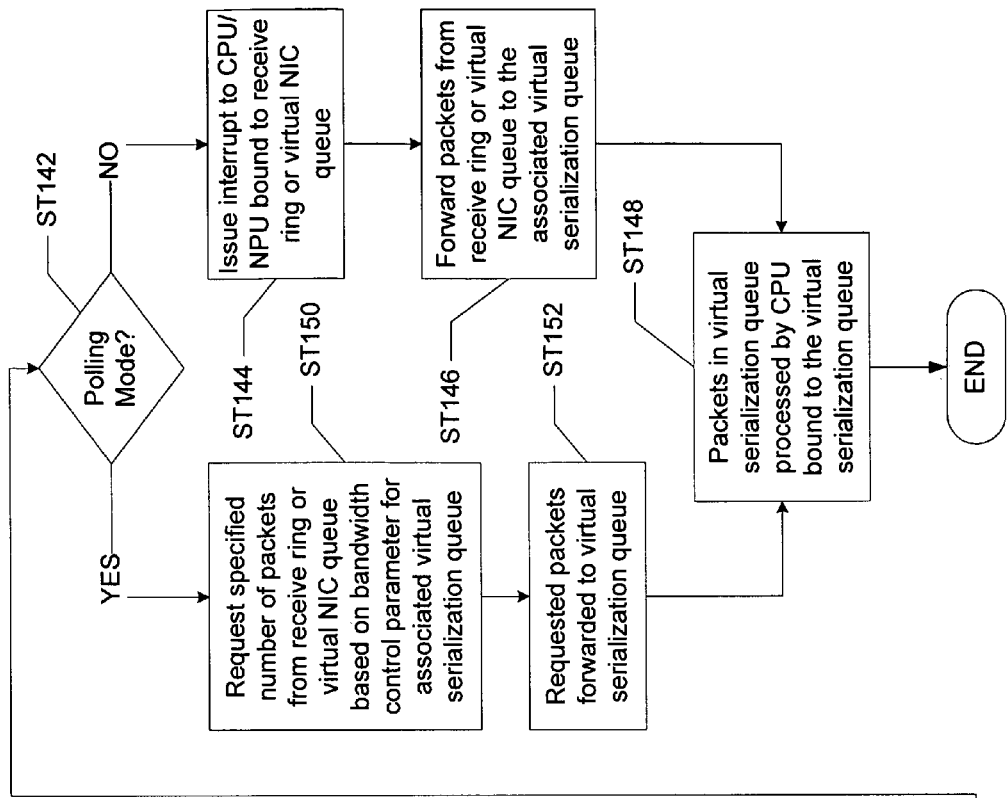
FIG. 6 shows a flowchart in accordance with one embodiment of the invention.
Figure 6:
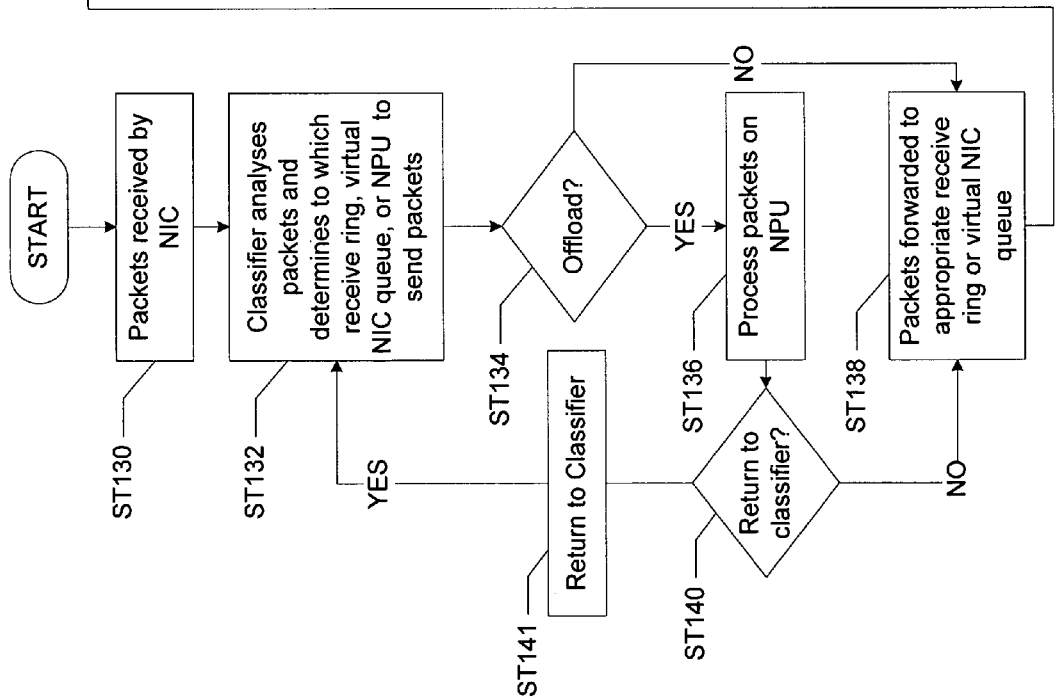

FIG. 6 shows a flowchart in accordance with one embodiment of the invention. Initially, one or more packets are received by the NIC (ST130). A classifier (either a hardware classifier residing in the NIC or a software classifier residing in the host operatively connected to the NIC) analyses each packet and determines which of the receive rings (if the classifier is a hardware classifier) or virtual NIC queues (if the classifier is a software classifier) to forward each of the packets (ST132). The classifier subsequently determines whether any of the packets received in ST130 may be offloaded to a NPU (ST134). Any packets that cannot be offloaded to a NPU are subsequently forwarded to the appropriate receive ring (if the classifier is a hardware classifier) or virtual NIC queue (if the classifier is a software classifier) as determined by the classifier (ST138). Alternatively, all packets that may be offloaded to a NPU (there may be more than one NPU in a given system) are subsequently forwarded to and processed by the appropriate NPU (ST136). At this stage a determination is made about whether the processed packets (i.e., the packets processed by the appropriate NPU) need to be returned to classifier for re-classification (ST140). All processed packets that need to be returned to classifier are subsequently returned to the classifier (ST141). Alternatively, any processed packets that do not need to be returned to the classifier are subsequently forwarded to the appropriate receive ring (if the classifier is a hardware classifier) or virtual NIC queue (if the classifier is a software classifier) as determined by the classifier (ST138).

At this stage, the processing of the packets differs depending on which mode the virtual serialization queue (which is bound to the receive ring or virtual NIC queue via the stack) is operating in. Specifically, the processing of the packets depends on whether the virtual serialization queue is operating in polling mode or interrupt mode (ST142).

If the virtual serialization queue is operating in polling mode, then the packets remain in the receive ring or virtual NIC queue (depending on the implementation) until the virtual serialization queue requests a specified number of packets from the receive ring or virtual NIC queue based on the bandwidth control parameter (ST150). The requested number of packets is then forwarded to the virtual serialization queue (ST152). In one embodiment of the invention, the virtual serialization queue does not request any packets when packets are already queued on the virtual serialization queue. Those skilled in the art will appreciate that the once the virtual serialization queue receives the packets from the receive ring or virtual NIC queue, the virtual serialization queue may place each of the packets in an appropriate sub-virtual serialization queue based on the results of the classifier analysis in ST132.

Those skilled in the art will appreciate the virtual serialization queue may operate in polling mode without utilizing a bandwidth control parameter. Thus, if no bandwidth control parameter is specified, then all packets for the virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues are receiving packets at a faster rate than the corresponding virtual serialization queue is requesting packets, the receive rings and/or virtual NIC queues fills with packets and packets received after this point are dropped until packets on the receive rings and/or virtual NIC queues are requested and processed.

Alternatively, if the virtual serialization queue is operating in interrupt mode, then an interrupt is issued to the CPU bound to the receive ring or virtual NIC queue (i.e., the CPU bound to the virtual serialization queue that is bound to the stack associated with the receive ring or virtual NIC queue) (ST144). When the interrupt is serviced, all packets in the receive ring or virtual NIC queue are forwarded to the virtual serialization queue (ST146).

Once the packets are placed on the virtual serialization queue, regardless of the mode in which the virtual serialization queue is operating, the packets are processed by the CPU bound to the particular virtual serialization queue (ST148). In one embodiment of the invention, the specific order in which the packets in a particular sub-virtual serialization queue are processed is determined by the packet scheduler.

Figure 7:
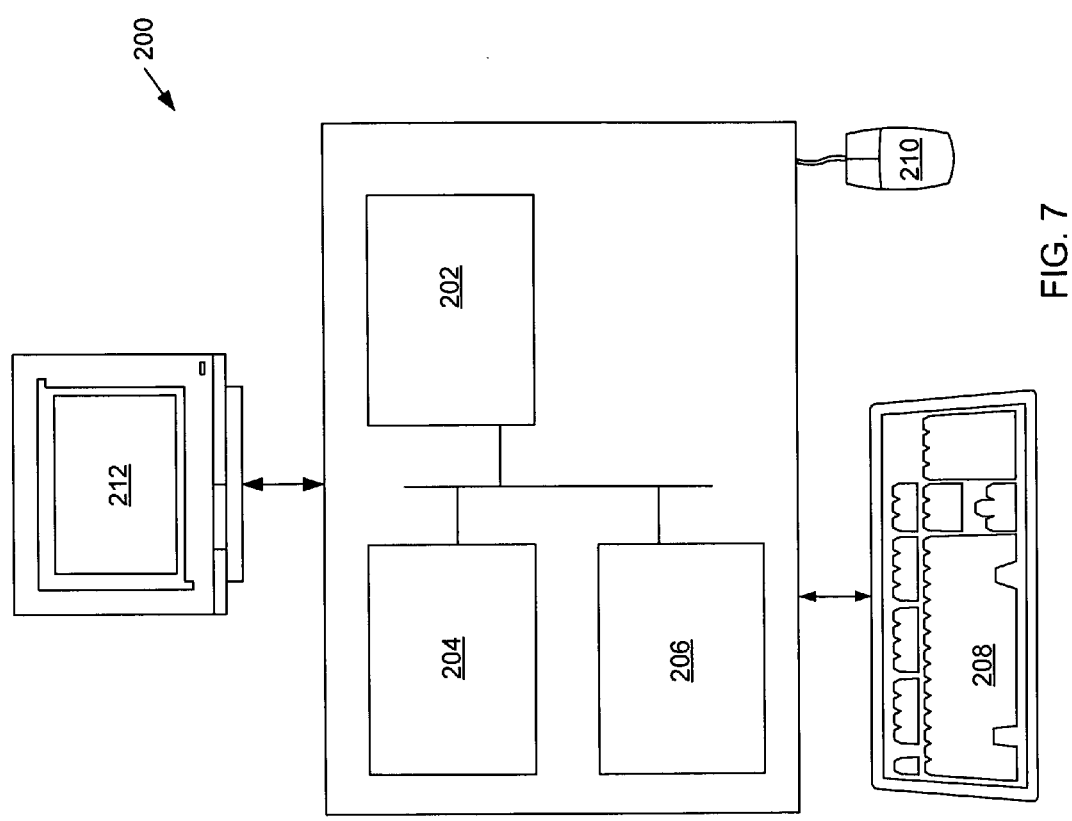
FIG. 7 shows a computer system in accordance with one embodiment of the invention.

An embodiment of the invention may be implemented on virtually any type of computer regardless of the platform being used. For example, as shown in FIG. 7, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a plurality of packets, comprising:
   receiving a plurality of packets from a network;
   analyzing each of the plurality of packets by a classifier to determine to which of a plurality of temporary data structures each of the plurality of packets is to be forwarded, wherein the classifier analyzes each of the plurality of packets to determine with which of a plurality of protocols each of the plurality of packets is associated, wherein the classifier is one selected from a group consisting of a hardware classifier and a software classifier, and wherein each of the plurality of temporary data structures comprises at least one selected from a group consisting of a virtual network interface card (NIC) queue and a receive ring;
   forwarding each of the plurality of packets to one of the plurality of temporary data structures as determined by the classifier, wherein each of the plurality of temporary data structures is configured to store packets associated with at least one of the plurality of protocols;
   forwarding a plurality of packets from the one of the plurality of temporary data structures to a virtual serialization queue associated with the one of the plurality of temporary data structures using one mode selected from a group consisting of polling mode and interrupt mode; and
   processing the plurality of packets on the virtual serialization queue using a processor bound to the virtual serialization queue.

2. The method of claim 1, further comprising:
   creating a virtual network stack prior to receiving the plurality of packets from the network, wherein the virtual serialization queue is associated with the virtual network stack.

3. The method of claim 2, wherein creating the virtual network stack comprises:
   creating the virtual serialization queue;
   binding the virtual serialization queue to a processor;
   binding the virtual serialization queue to a packet destination;
   creating a virtual network interface card (NIC); and
   binding the virtual serialization queue to the virtual NIC and a virtual protocol stack to obtain the virtual network stack.

4. The method of claim 3, wherein the packet destination is at least one selected from a group consisting of a container and a service.

5. The method of claim 1, further comprising:
   prior to forwarding each of the plurality of packets to one of the plurality of temporary data structures as determined by the classifier:
   sending at least one of the plurality of packets to a network processing unit (NPU) to obtain a processed packet, wherein the NPU is configured to process the at least one of the plurality of packets associated with at least one of the plurality of protocols;
   forwarding the processed packet to the classifier, if the processed packet needs to be re-classified; and
   forwarding the processed packet to the one of the plurality of temporary data structures as determined by the classifier, if the processed packet does not need to be re-classified.

6. The method of claim 1, wherein polling mode comprises:
   requesting the plurality of packets from the one of the plurality of temporary data structures associated with the virtual serialization queue; and
   forwarding the plurality of packets to the virtual serialization queue.

7. The method of claim 1, wherein the processor is configured to only process packets associated with at least one of the plurality of protocols.

8. The method of claim 1, wherein forwarding the plurality of packets from the one of the plurality of temporary data structures to the virtual serialization queue comprises:
   forwarding the plurality of packets from the one of the plurality of temporary data structures to a virtual protocol stack associated with the at least one selected from a group consisting of a container and a service for processing of the plurality of packets to obtain a plurality of processed packets; and forwarding the plurality of processed packets from the virtual protocol stack to the virtual serialization queue.

9. A system, comprising:

a network interface configured to receive a plurality of packets from a network;

a classifier operatively connected to the network interface configured to analyze each of the plurality of packets and determine to which of a plurality of temporary data structures each of the plurality of packets is forwarded, wherein the classifier analyzes each of the plurality of packets to determine with which of a plurality of protocols each of the plurality of packets is associated, and wherein each of the plurality of temporary data structures comprises at least one selected from a group consisting of a virtual network interface card (NIC) queue and a receive ring;

the plurality of temporary data structures configured to receive packets from the classifier, wherein each of the plurality of temporary data structures is associated with at least one virtual serialization queue and wherein each of the plurality of temporary data structures is configured to store packets associated with at least one of the plurality of protocols; and the at least one virtual serialization queue configured to queue a plurality of packets from the one of the plurality of temporary data structures associated with the at least one virtual serialization queue, wherein the plurality of packets are queued on the at least one virtual serialization queue using at least one selected from a group consisting of polling mode and interrupt mode.

10. The system of claim 9, further comprising:

a network processing unit operatively connected to the classifier and configured to processes a packet associated with at least one of the plurality of protocols received from the classifier.

11. The system of claim 9, further comprising:

at least one packet destination associated with the at least one virtual serialization queue and configured to receive the plurality of packets from the at least one virtual serialization queue.

12. The system of claim 11, wherein the at least one packet destination comprises at least one selected from a group consisting of a service and a container.

13. The system of claim 9, further comprising:

a processor configured to process the plurality of packets queued on the at least one virtual serialization queue.

14. The system of claim 9, wherein the at least one virtual serialization queue is associated with a virtual network stack.

15. The system of claim 13, wherein the virtual network stack comprises a virtual network interface card, a virtual protocol stack, and the at least one virtual serialization queue.

16. The system of claim 9, wherein the classifier is one selected from a group consisting of a hardware classifier and a software classifier.

17. A computer readable medium comprising software code for processing a plurality of packets, comprising software instructions to:

receive a plurality of packets from a network;

analyze each of the plurality of packets by a classifier to determine to which of a plurality of temporary data structures each of the plurality of packet is to be forwarded, wherein the classifier analyzes each of the plurality of packets to determine with which of a plurality of protocols each of the plurality of packets is associated, wherein the classifier is one selected from a group consisting of a hardware classifier and a software classifier, and wherein each of the plurality of temporary data structures comprises at least one selected from a group consisting of a virtual network interface card (NIC) queue and a receive ring;

forward each of the plurality of packets to one of the plurality of temporary data structures as determined by the classifier, wherein each of the plurality of temporary data structures is configured to store packets associated with at least one of the plurality of protocols;

forward a plurality of packets from the one of the plurality of temporary data structures to a virtual serialization queue associated with the one of the plurality of temporary data structures using one mode selected from a group consisting of polling mode and interrupt mode; and process the plurality of packets on the virtual serialization queue using a processor bound to the virtual serialization queue.

18. The computer readable medium of claim 17, further comprising software instructions to:

create a virtual network stack prior to receiving the plurality of packets from the network, wherein the virtual serialization queue is associated with the virtual network stack.

* * * * *